US009912398B2

United States Patent
Shen et al.

(10) Patent No.: US 9,912,398 B2
(45) Date of Patent: Mar. 6, 2018

(54) TRANSMISSION METHOD, DETECTION METHOD AND EQUIPMENT FOR CONTROL CHANNELS OF A RELAY SYSTEM

(75) Inventors: Zukang Shen, Beijing (CN); Xueming Pan, Beijing (CN); Guojun Xiao, Beijing (CN); Libo Wang, Beijing (CN); Wenjian Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 115 days.

(21) Appl. No.: 13/498,316

(22) PCT Filed: Sep. 29, 2010

(86) PCT No.: PCT/CN2010/077490
§ 371 (c)(1),
(2), (4) Date: Mar. 26, 2012

(87) PCT Pub. No.: WO2011/038687
PCT Pub. Date: Apr. 7, 2011

(65) Prior Publication Data
US 2012/0182931 A1 Jul. 19, 2012

(30) Foreign Application Priority Data
Sep. 29, 2009 (CN) .......................... 2009 1 0235533

(51) Int. Cl.
H04W 72/04 (2009.01)
H04B 7/155 (2006.01)
H04L 5/00 (2006.01)

(52) U.S. Cl.
CPC ........... *H04B 7/155* (2013.01); *H04L 5/0053* (2013.01)

(58) Field of Classification Search
CPC .................................................. H04W 72/04
(Continued)

(56) References Cited

U.S. PATENT DOCUMENTS

2008/0298224 A1* 12/2008 Pi et al. ...................... 370/204
2010/0281323 A1* 11/2010 Wang et al. ................. 714/748
(Continued)

FOREIGN PATENT DOCUMENTS

| CN | 101267239 A | 9/2008 |
| CN | 101527916 A | 9/2009 |
| KR | 20080065559 A | 7/2008 |
| KR | 20080086317 A | 9/2008 |
| KR | 20080097682 A | 11/2008 |
| WO | 2008004806 A1 | 1/2008 |

OTHER PUBLICATIONS

International Search Report dated Jan. 6, 2011, issued in PCT/CN2010/077490.
(Continued)

*Primary Examiner* — Edan Orgad
*Assistant Examiner* — Nourali Mansoury
(74) *Attorney, Agent, or Firm* — Handal & Morofsky LLC

(57) ABSTRACT

A configuration method, detection method and equipment for control channels of a relay system are provided in the present invention. The configuration method comprises: the network side transmits a Relay-Physical Downlink Control Channel (R-PDCCH) of a control channel to its service relay equipment, the related control information of said relay equipment is included in said R-PDCCH, said R-PDCCH is a dedicated R-PDCCH of said relay equipment. In the present invention, the dedicated control channel of the relay system is configured according to the number of Orthogonal Frequency Division Multiplexing (OFDM) symbols occupied by a R-PDCCH, and the mapping from a R-PDDCH/Relay-Physical Downlink Shared Channel (R-PDSCH) to a Resource Element (RE), and the demand that one relay node dedicates a R-PDCCH is satisfied.

11 Claims, 12 Drawing Sheets

(58) Field of Classification Search
USPC .......................................... 370/241, 315, 328
See application file for complete search history.

(56) References Cited

U.S. PATENT DOCUMENTS

| | | | |
|---|---|---|---|
| 2012/0113884 A1* | 5/2012 | Park et al. .................... | 370/312 |
| 2012/0128039 A1* | 5/2012 | Kim et al. .................... | 375/211 |
| 2012/0155561 A1* | 6/2012 | Seo et al. ...................... | 375/260 |
| 2012/0178360 A1* | 7/2012 | Park et al. ........................ | 455/7 |

OTHER PUBLICATIONS

Korean Patent Office, Notification of the Office Action (English Translation), Korean Patent Application No. 10-2011-7030050, dated Aug. 8 2013.

Korean Patent Office, Notification of the Office Action (in Korean), Korean Patent Application No. 10-2011-7030050, dated Aug. 8, 2013.

Chinese Patent Office, International Search Report (in Chinese), International Application No. PCT/CN2010/077490, dated Jan. 6, 2011.

Chinese Patent Office, International Search Report (English Translation), International Application No. PCT/CN2010/077490, dated Jan. 6, 2011.

Research in Motion, UK Limited, "Relay Link Control Signalling", 3GPP TSG RAN WG1 Meeting, R1-091151, Mar. 23-27, 2009, Seoul, Korea.

Catt, "Design of Backhaul Control Channel for Type I Relay in LTE-A", 3GPP TSG RAN WG1 #57, R1-091990, May 4-8, 2009, San Francisco, USA.

LG Electronics, "Resource Allocation and Downlink Control Channel Structure for Relay Backhaul Link", 3GPP TSG RAN WG1 Meeting #57, R1-092115, May 4-8, 2009, San Francisco, USA.

Motorola, "Relay Backhaul Design", 3GPP TSG RAN WG1 Meeting #58 R1-093414, Aug. 24-28, 2009, Shenzhen, China.

* cited by examiner

--PRIOR ART--

TRANSMISSION METHOD, DETECTION METHOD AND EQUIPMENT FOR CONTROL CHANNELS OF A RELAY SYSTEM

The present application claims the priority of the Chinese patent application with the application date of Sep. 29, 2009, the application number of 200910235533.7, and the patent name of "configuration method, detection method and equipment for control channels of a relay system". All content of the priority application is combined into the present application by quoting.

FIELD OF THE PRESENT INVENTION

The present invention relates generally to the field of communication, and more particularly to methods and equipments of transmitting and detecting control channels of a relay system.

BACKGROUND OF THE PRESENT INVENTION

With the introduction of RN (Relay Node), there are three wireless links of mobile communication system comprising Relay: the direct link between eNB (evolved NodeB) and macro UE (macro User Equipment), the backhaul link between eNB and RN, and the access link between RN and R-UE (the user equipment served by RN). Considering the wireless communication signal interference, the three links need to use orthogonal wireless resources. In the same band, in order to avoid self-interference, relay node cannot transmit and receive data simultaneously. In the LTE-A (Long Term Evolution-Advanced), relay node can exchange backhaul data with its donor eNB using MBSFN (Multicast Broadcast Single Frequency Network) sub-frames, as shown in FIG. 1.

In more detail, as shown in FIG. 2, in one MBSFN sub-frame, a relay node transmits PDCCH (physical downlink control channel) to the user equipment (R-UE) served by the relay node on one or two OFDM (Orthogonal Frequency Division Multiplexing) symbols. On the other OFDM symbols of this MBSFN sub-frame, the relay node can receive control information (R-PDCCH) and data information (R-PDSCH, Physical Downlink Shared Channel) from the donor eNB. In the frequency domain, R-PDCCH can be transmitted on a set of pre-configured resource blocks. Different relay nodes can share these R-PDCCH resource blocks, and each relay node blindly detects its DL grant and UL grant in this set of resource blocks. An example is shown in FIG. 2 where RN1 and RN2 share the same set of R-PDCCH resource blocks. Relay node derives its R-PDSCH resource allocation according to the DL grant blindly detected from the set of R-PDCCH resource blocks. Base station can schedule macro UE and relay node in one sub-frame, as long as the allocated resources are orthogonal for the macro UE and relay node. The downlink data of Macro-UE is called PDSCH, as shown in FIG. 2.

While the set of R-PDCCH resource blocks can be shared by multiple relay nodes as shown in FIG. 2, the set of R-PDCCH resource blocks can also be specific to one relay node (RN specific), as shown in FIG. 3, where the R-PDCCH resource blocks of RN1 is specific to RN1, i.e. each resource block used to transmit R-PDCCH of RN1 only comprises the R-PDCCH of RN1. The control signaling for RN1 transmitted in RN1's R-PDCCH resource blocks comprises DL grant and UL grant etc. Others R-PDCCH resources can exist, and may be shared by several relay nodes, for example, by RN2 and RN3.

However, there is no detailed design of relay node dedicated R-PDCCH, thus not able to satisfy the need to have relay node dedicated R-PDCCH.

SUMMARY OF THE PRESENT INVENTION

The embodiment of the present invention provides a transmission method, detection method and equipment for control channels of a relay system, to achieve the design of relay node dedicated R-PDCCH for relay node.

The embodiment of the present invention provides a transmission method for control channels of a relay system, comprising:

A base station transmitting a control channel Relay Physical Downlink Control Channel R-PDCCH to a relay node RN, wherein said R-PDCCH contains downlink control information to said RN, and said R-PDCCH is transmitted on dedicated R-PDCCH time-frequency resources wherein the time-frequency resources for transmission of said R-PDCCH to said RN is not used for transmission of any other R-PDCCH to any other RN.

The embodiment of the present invention provides a method for detecting control channel of relay system, comprising:

A relay node RN receiving a control channel Relay Physical Downlink Control Channel R-PDCCH sent by a base station, wherein said R-PDCCH contains downlink control information, and said R-PDCCH is transmitted on dedicated R-PDCCH time-frequency resources wherein the time-frequency resources for transmission of said R-PDCCH to said RN is not used for transmission of any other R-PDCCH to any other RN.

The embodiment of the present invention provides a base station equipment, comprising:

Channel transmitting unit, for transmitting a control channel Relay Physical Downlink Control Channel R-PDCCH to a relay node RN, wherein said R-PDCCH contains downlink control information to said RN, and said R-PDCCH is transmitted on dedicated R-PDCCH time-frequency resources wherein the time-frequency resources for transmission of said R-PDCCH to said RN is not used for transmission of any other R-PDCCH to any other RN.

The embodiment of the present invention provides a relay equipment, comprising:

Receiving unit, for receiving a control channel Relay Physical Downlink Control Channel R-PDCCH sent by a base station, wherein said R-PDCCH is received on dedicated R-PDCCH time-frequency resources wherein the time-frequency resources for receiving of said R-PDCCH to said RN is not used for transmission of any other R-PDCCH to any other RN.

Deriving unit, for deriving control information of said RN in said R-PDCCH.

Compared with existing technologies, the present invention has the following advantages at least:

In the embodiments of the present invention, the design of dedicated control channel for relay node is achieved by configuration according to the number of OFDM symbols occupied by R-PDCCH and the mapping from R-PDDCH/R-PDSCH to Resource Element (RE), in order to meet the demand that R-PDCCH can be dedicated to one relay node.

BRIEF DESCRIPTION OF THE DRAWINGS

The following figures are used in order to explain the technical details of the present invention or existing techniques more clearly. Obviously, the figures in the following description are only some embodiments of this invention. For technical personnel in this field, they can also derive other figures according to the figures in the following description, on the premise of not paying creative labor.

DETAILED DESCRIPTION OF THE EMBODIMENTS OF THE PRESENT INVENTION

The core idea of the present invention is that the dedicated control channel of the relay system is configured according to the number of OFDM symbols occupied by R-PDCCH and the mapping of R-PDCCH/R-PDSCH to RE.

Figure 1:
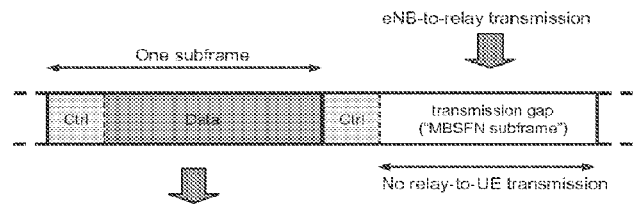
FIG. 1 is an illustration of relay node exchanging backhaul data with its donor eNB using MBSFN sub-frame as in existing technologies.
Figure 2:
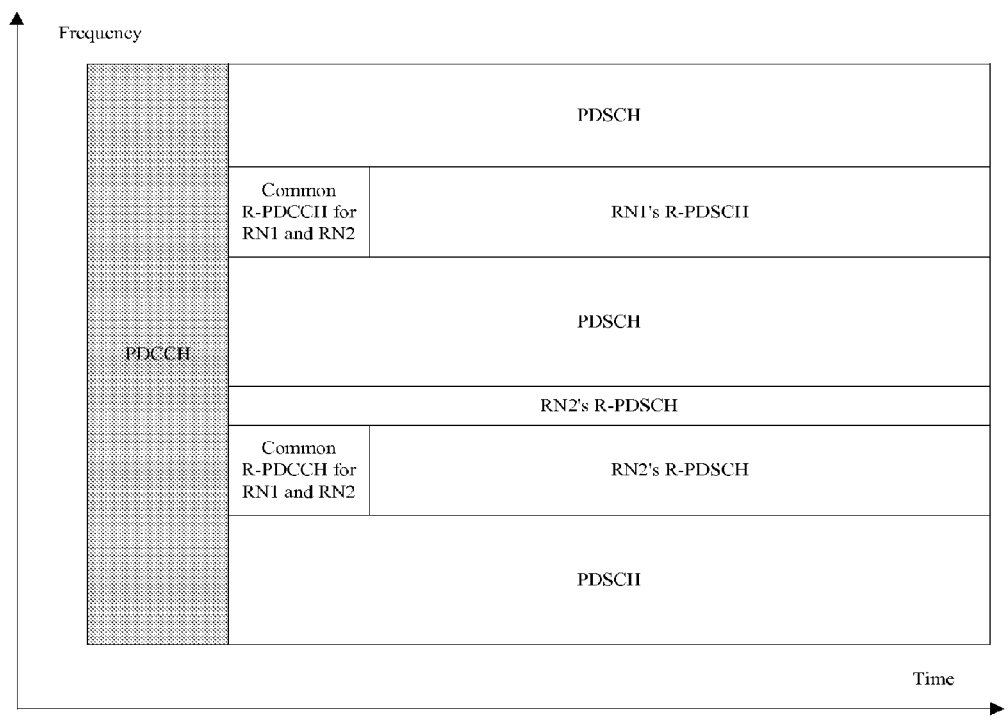
FIG. 2 is an illustration of relay node transmitting PDCCH to the user equipment serviced by the relay node in one MBSFN sub-frame as in existing technologies.
Figure 3:
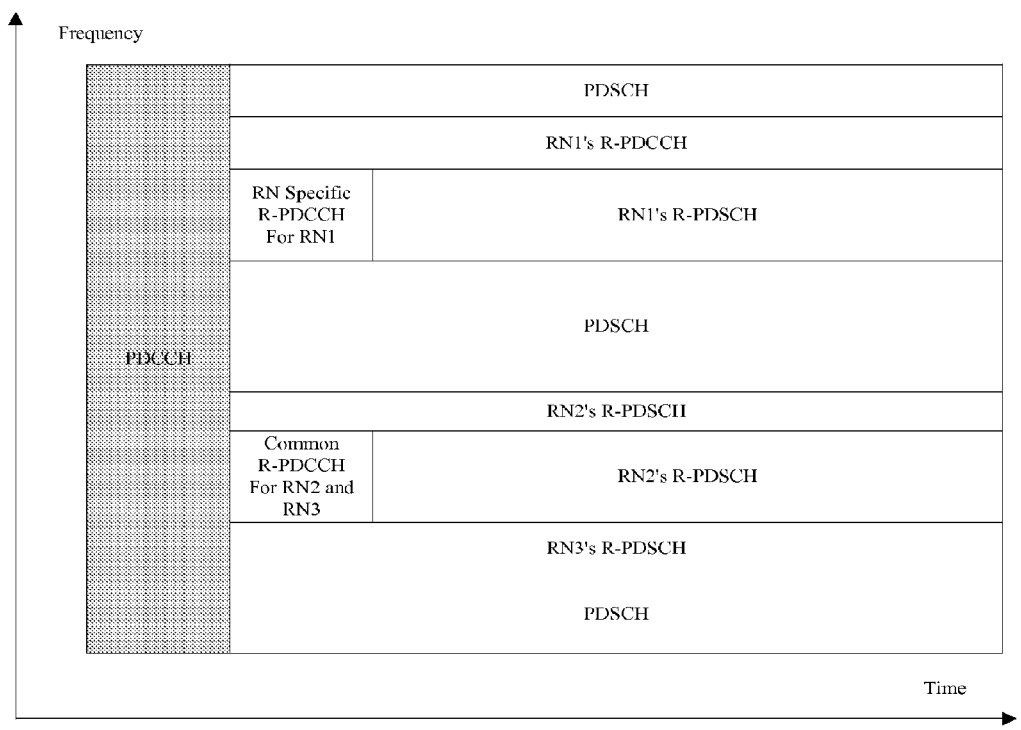
FIG. 3 is an illustration of R-PDCCH being specific for one relay node's PDCCH as in existing technologies.
Figure 4A:
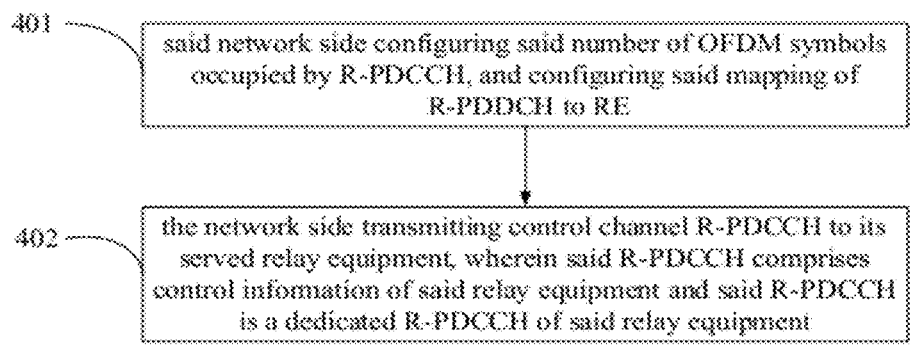
FIG. 4a is a process diagram of the method for configuring the dedicated control channels of relay system provided in one embodiment of the present invention.

The embodiment of the present invention provides a method for configuring control channel of relay system, as shown in FIG. 4a, comprising the following steps:

Step 401, said network side configuring said number of OFDM symbols occupied by R-PDCCH, and configuring said mapping of R-PDDCH to RE.

Step 402, the network side transmitting control channel R-PDCCH to its served relay equipment, wherein said R-PDCCH comprises control information of said relay equipment and said R-PDCCH is a dedicated R-PDCCH of said relay equipment.

Thereinto, said network side configuring said number of OFDM symbols occupied by R-PDCCH, comprising:

Said network side pre-configuring said number of OFDM symbols occupied by R-PDCCH; or Said network side transmitting R-PCFICH (Relay-Physical Control Format Indicator Channel) at the same time-frequency region with said R-PDCCH, wherein the resource elements RE occupied by said R-PCFICH are different from resource elements RE occupied by said R-PDCCH and said R-PCFICH indicates the number of OFDM symbols occupied by said R-PDCCH.

Said configuring mapping of said R-PDCCH to resource element RE, comprising:

Said network side mapping said R-PDCCH to resource element RE via frequency domain priority, i.e. said R-PDCCH is mapped onto resource elements first in ascending order of RE index and then in ascending order of OFDM symbol index.

Said configuring mapping of said R-PDCCH to resource element RE, comprising at least one of the following:

When the number of OFDM symbols occupied by said R-PDCCH is indicated by said R-PCFICH, said R-PDCCH resource configured by network side comprises resource elements for R-PCFICH, resource elements for DCI format (Downlink Control Information format) corresponding to DL grant, resource elements for DCI format corresponding to UL grant, and vacant R-PDCCH resource elements.

When the number of OFDM symbols occupied by said R-PDCCH is semi-statically configured, said R-PDCCH resource configured by network side comprises resource elements for DCI format corresponding to DL grant, resource elements for DCI format corresponding to UL grant, and vacant R-PDCCH resource elements.

When the number of OFDM symbols occupied by said R-PDCCH is determined by said relay equipment via blind detection, said R-PDCCH resource configured by network side does not include vacant R-PDCCH resource elements.

Figure 4B:
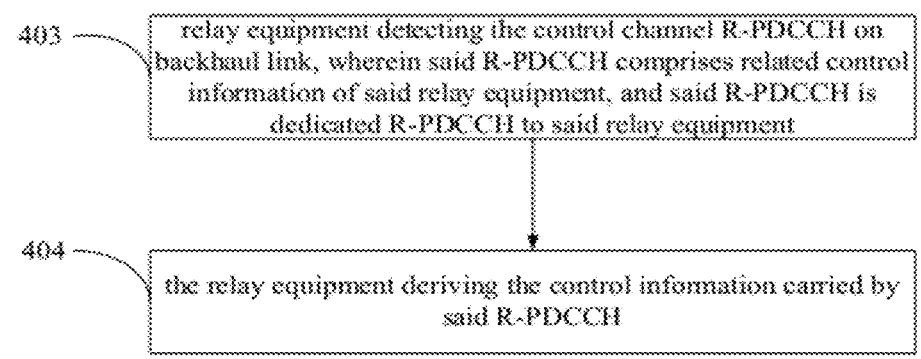
FIG. 4b is a process diagram of the method for detecting control channels of relay system provided in one embodiment of the present invention.

The embodiment of the present invention provides a method for detecting control channel of relay system, as shown in FIG. 4b, comprising the following steps:

Step 403, relay equipment detecting the control channel R-PDCCH on backhaul link, wherein said R-PDCCH comprises related control information of said relay equipment, and said R-PDCCH is dedicated R-PDCCH to said relay equipment.

Step 404, the relay equipment deriving the control information carried by said R-PDCCH.

Thereinto, said relay equipment detecting control channel R-PDCCH on backhaul link, comprising:

Said relay equipment deriving the number of OFDM symbols occupied by said R-PDCCH, and mapping of said R-PDCCH to resource element RE.

Said relay equipment deriving the number of OFDM symbols occupied by said R-PDCCH, comprising:

Said relay equipment deriving the number of OFDM symbols occupied by said R-PDCCH according to the pre-configuration, or Said relay equipment deriving the number of OFDM symbols occupied by said R-PDCCH via R-PCFICH, wherein said R-PCFICH is pre-configured and transmitted in part of the time-frequency region as said R-PDCCH.

Said relay equipment further deriving the resource elements for DCI format corresponding to DL grant, resource elements for DCI format corresponding to UL grant, and vacant R-PDCCH resource elements in said R-PDCCH, when said relay equipment derives the number of OFDM symbols occupied by said R-PDCCH according to pre-configuration;

Said relay equipment further deriving resource elements for R-PCFICH, resource elements for DCI format corresponding to DL grant, resource elements for DCI format corresponding to UL grant and vacant R-PDCCH resource elements in said R-PDCCH, when said relay equipment derives the number of OFDM symbols occupied by said R-PDCCH according to R-PCFICH.

Said relay equipment deriving the number of OFDM symbols occupied by said R-PDCCH, comprising:

Said relay equipment deriving the number of OFDM symbols occupied by said R-PDCCH by blind detection.

Said relay equipment deriving the number of OFDM symbols occupied by said R-PDCCH by blind detection, comprising:

Said relay equipment deriving size of each DCI format transmitted by said R-PDCCH and coding rates of said DCI format used by said network side;

Said relay equipment blind detecting said DCI format according to coding rates of DCI format used by said network side.

Said relay equipment deriving the size of each DCI format transmitted by said R-PDCCH, comprising:

Said relay equipment deriving size of each DCI format transmitted by said R-PDCCH according to the system bandwidth and the DCI format type that needs to be monitored.

Said relay equipment deriving coding rates of DCI format used by said network side, comprising:

Said relay equipment receiving high-layer signaling from network side, wherein said high-level signaling carries a set of coding rates for DCI format used by said network side: or Said relay equipment pre-configuring a set of coding rates for DCI format used by said network side.

Said relay equipment deriving the number of OFDM symbols occupied by said R-PDCCH by blind detection, comprising:

Said relay equipment deriving a subset of all CCE aggregation levels by receiving indication from network side, and blind detecting R-PDCCH according to said subset.

Figure 5:
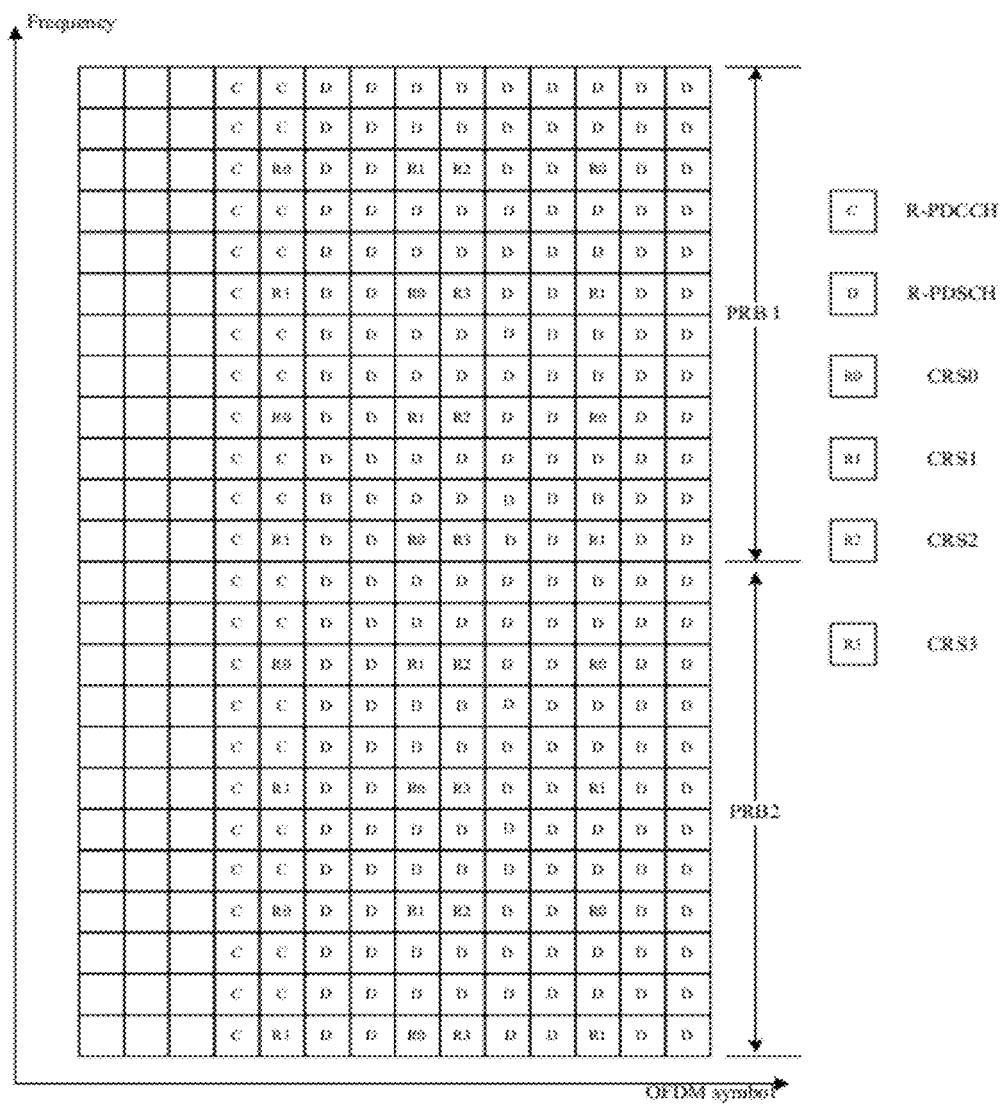
FIG. 5 is an illustration of the base station pre-configured R-PDCCH frequency domain resources in one embodiment of the present invention.

In more detail, the relay equipment in the embodiment of the present invention is also referred to as relay node RN. For RN-specific R-PDCCH, the frequency domain resource used to transmit R-PDCCH can be pre-configured by base station. In the embodiment of the present invention, as shown in FIG. 5, one RN specific R-PDCCH occupying two resource blocks in frequency domain is used as an example for the purpose of illustration. Thereinto, each resource block consists of 12 resource elements, and each resource element is 15 kHz in frequency domain. Each resource element (i.e. sub-frame) includes 14 OFDM symbols, for example.

In LTE/LTE-A system, using normal CP as an example, one sub-frame consists of 14 OFDM symbols. In the first several OFDM symbols, RN needs to transmit control information to R-UE, and hence cannot receive the signal from base station. In this present invention, as shown in FIG. 5, RN starts receiving R-PDCCH and R-PDSCH from the fourth OFDM symbol. At the same time, taking into account that the donor eNB needs to transmit CRS (Common Reference Signal) to macro-UE, R-PDCCH and R-PDSCH cannot occupy the resource elements of CRS and CRS shall be transmitted in a set of the OFDM symbols in RN specific R-PDCCH. In FIG. 5, assuming four CRSs as an example, CRS shall be transmitted on several OFDM symbols in RN specific R-PDCCH resource block.

In the embodiment of the present invention, eNB may also not transmit CRS in R-PDSCH and R-PDCCH resource. For example, eNB does not transmit CRS in MBSFN sub-frame when backhaul sub-frame is a MBSFN subframe in the macro cell.

In R-PDCCH, donor eNB may need to transmit multiple DCI formats (Downlink Control Information format) to one RN. For example, a DCI format can contain DL (Downlink) grant, and another DCI format can contain UL (Uplink) grant. The design of RN specific R-PDCCH need to consider the following: the number of OFDM symbols occupied by R-PDCCH, the mapping of R-PDCCH/R-PDSCH to RE (Resource Element), the demodulation of R-PDCCH/R-PDSCH, and the blind detection of R-PDCCH. The following discusses these four areas one by one.

Figure 6:
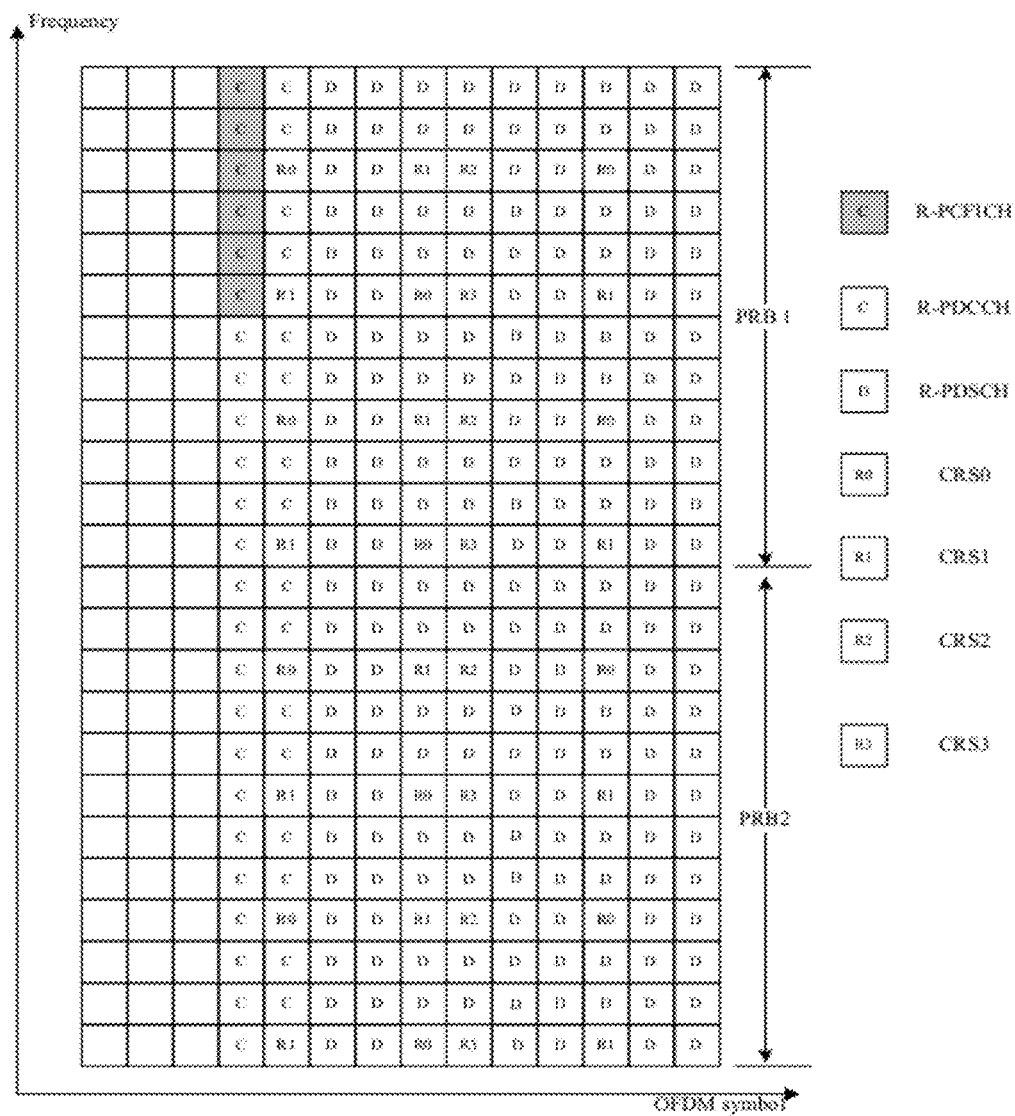
FIG. 6 is an illustrating of eNB transmitting R-PCFICH on R-PDCCH to indicate the number of OFDM symbols in the time domain occupied by R-PDCCH in one embodiment of the present invention.

We first discuss the number of OFDM symbols occupied by R-PDCCH:

The R-PDCCH resource in frequency domain can be pre-configured by base station, as shown in FIG. 6, where RN specific R-PDCCH for each RN is configured to occupy two resource blocks in the frequency domain.

The R-PDCCH resource in time domain (i.e. the number of OFDM symbols occupied by R-PDCCH) can be agreed, or configured by base station. If the R-PDCCH resource in time domain is configured by base station, the base station can transmit R-PCFICH at the pre-agreed position of R-PDCCH, to indicate the number of OFDM symbols occupied by R-PDCCH in time domain. As shown in FIG. 6, when base station indicates the number of OFDM symbols occupied by R-PDCCH in time domain by transmitting R-PCFICH in R-PDCCH, R-PCFICH is transmitted at the pre-configured position associated with a RN in the allocated R-PDCCH resource block. RN determines the pre-configured position and receives R-PCFICH at that position, derives the number of OFDM symbols occupied respectively by R-PDCCH and R-PDSCH by demodulating R-PCFICH, and receives R-PDCCH and R-PDSCH respectively. Of course, the position of R-PCFICH in R-PDCCH resource block shown in FIG. 6 is just an example provided in the present invention. Ordinary personnel of this field should understand that as long as the RN derives R-PCFICH position a priori, R-PCFICH also can be transmitted at other position in the R-PDCCH resource block.

In the embodiment of the present invention, base station may also not inform RN on the number of OFDM symbols occupied by R-PDCCH in time domain. RN needs to blind detect the length of R-PDCCH, i.e. the number of RE (Resource Element) occupied by R-PDCCH.

The following discusses the mapping of R-PDCCH/R-PDSCH to RE:

R-PDCCH can be mapped to RE via frequency domain priority. More specifically, R-PDCCH is first mapped to different REs in frequency domain of an R-PDCCH OFDM symbol. In the case R-PDCCH resources in one R-PDCCH OFDM symbol are full, continue to map said R-PDCCH on the next R-PDCCH OFDM symbol.

Figure 7:
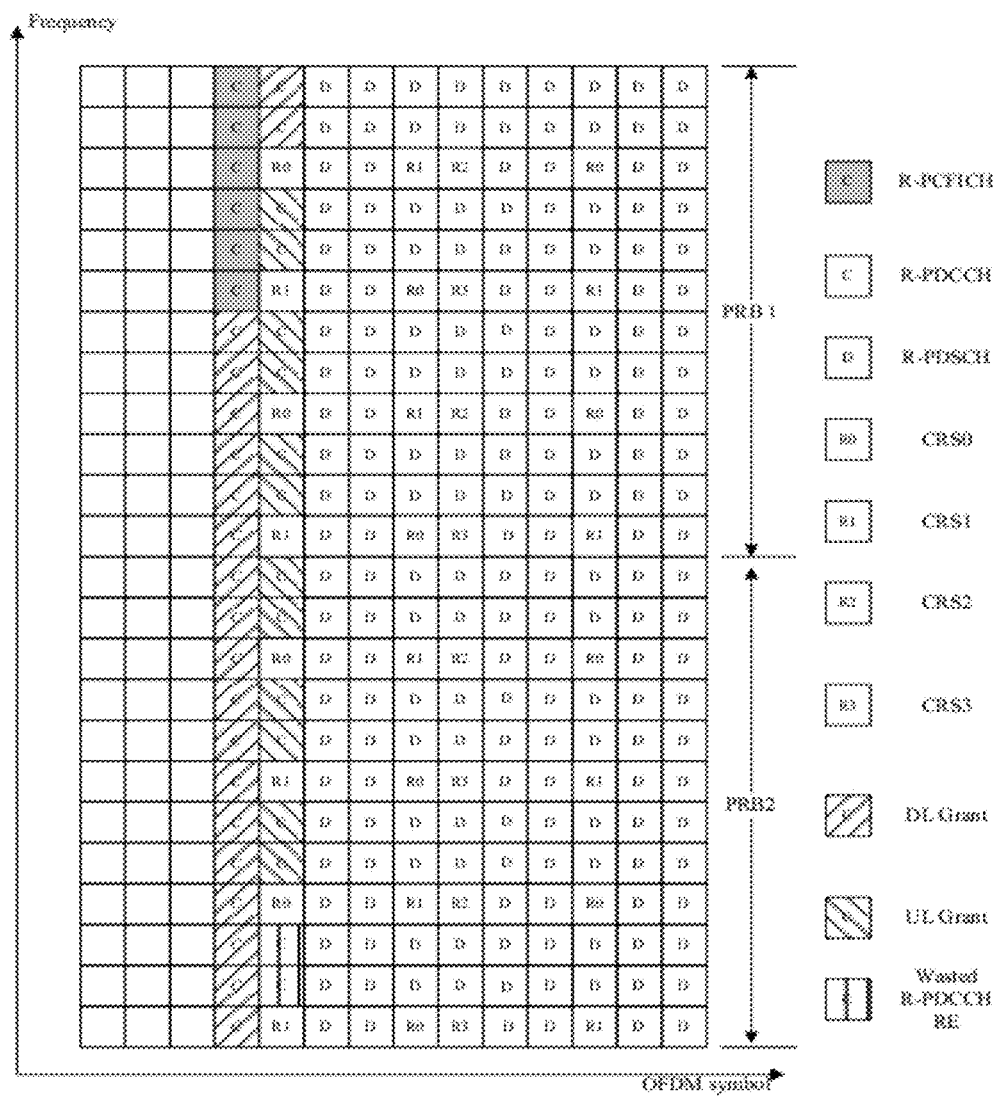
FIG. 7 is an illustration of R-PDCCH comprising DCI formats in one embodiment of the present invention.

When the number of OFDM symbols of R-PDCCH is indicated by R-PCFICH, as shown in FIG. 7, the resource block of R-PDCCH comprises REs of R-PCFICH, REs of DCI format for corresponding DL grant, RE of DCI format for corresponding UL grant, and some vacant REs.

Figure 8:
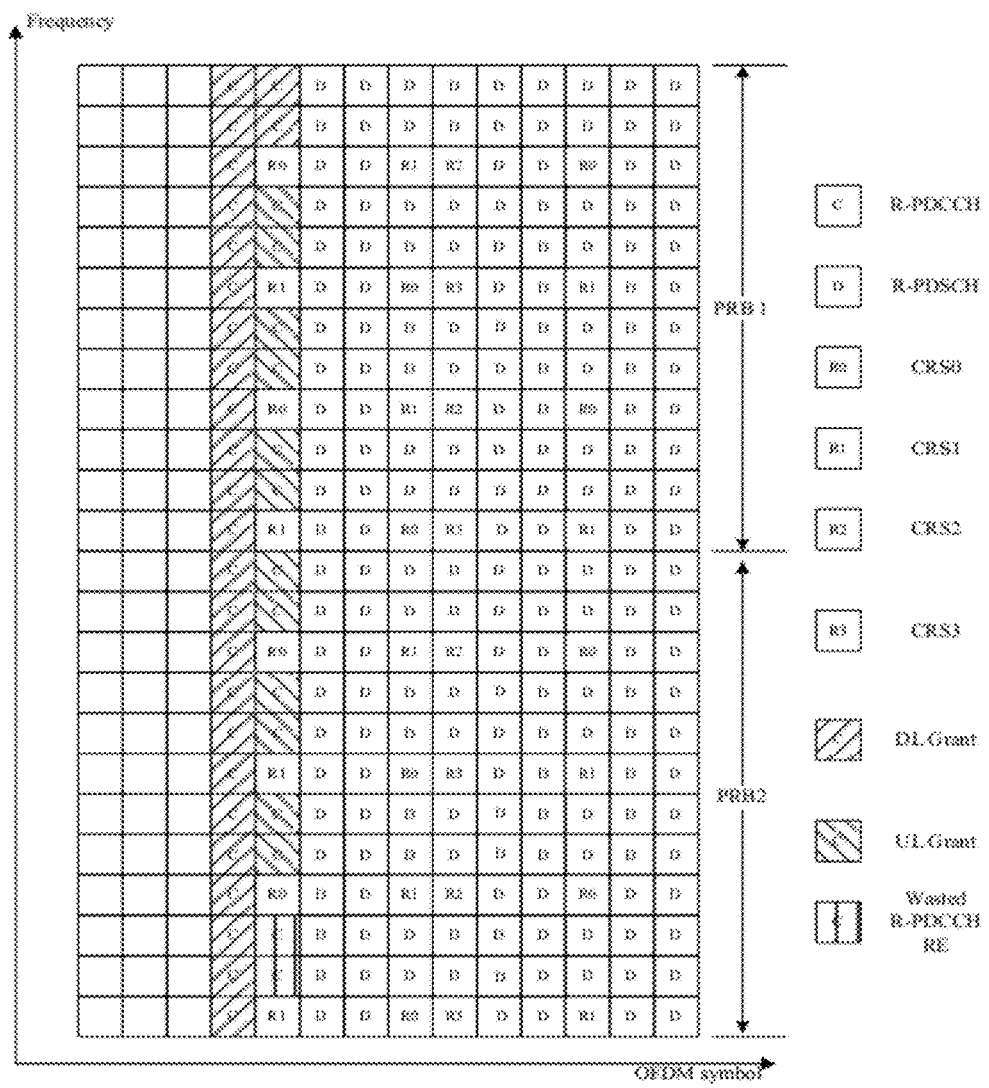
FIG. 8 is another illustration of R-PDCCH comprising DCI formats in one embodiment of the present invention.

When the base station semi-statically configures the number of OFDM symbols of R-PDCCH for RN (for example, two OFDM symbols), or the number of OFDM symbols of R-PDCCH is agreed, as shown in FIG. 8, the resource block of R-PDCCH comprises REs of DCI format for corresponding DL grant, RE of DCI format for corresponding UL grant, and some vacant REs.

In the examples shown in FIG. 7 and FIG. 8, RN can determine the number of OFDM symbols occupied by R-PDCCH according to R-PCFICH or according to the semi-static configuration of base station or according to the agreement, and therefore RN can determine the start position of R-PDSCH resource element.

Figure 9:
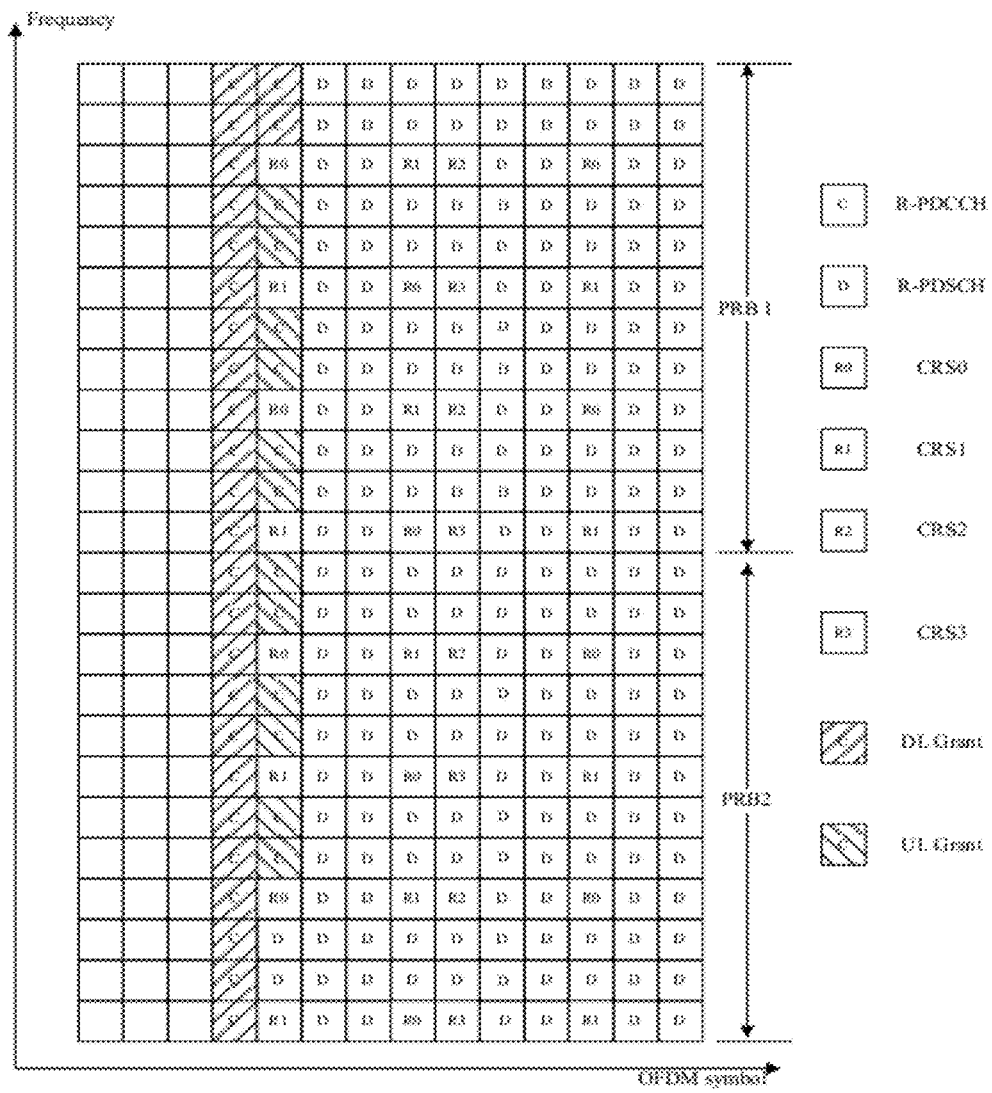
FIG. 9 is another illustration of R-PDCCH in one embodiment of the present invention.

If RN does not know the number of OFDM symbols occupied by R-PDCCH, RN also does not know the start position of R-PDSCH. Therefore, RN needs to determine the set of REs occupied by R-PDCCH through blind detection, and further determine the set of REs occupied by R-PDSCH. As shown in the example in FIG. 9, base station does not indicate the number of OFDM symbols of R-PDCCH via R-PCFICH, and does not semi-statically configure or use pre-agreed rule to determine the number of OFDM symbols of R-PDCCH. Then, after all R-PDCCH are mapped to REs, R-PDSCH could use the next RE immediately, which means there is no wastage of RE resources in R-PDCCH resource block as there is no vacant REs.

The following discusses the demodulation of R-PDCCH/R-PDSCH:

RN receives the signal transmitted from base station, and demodulates R-PDCCH/R-PDSCH, which can be more specifically classified into the following two cases:

One of two cases is that there exists CRS in R-PDCCH.

Figure 10:
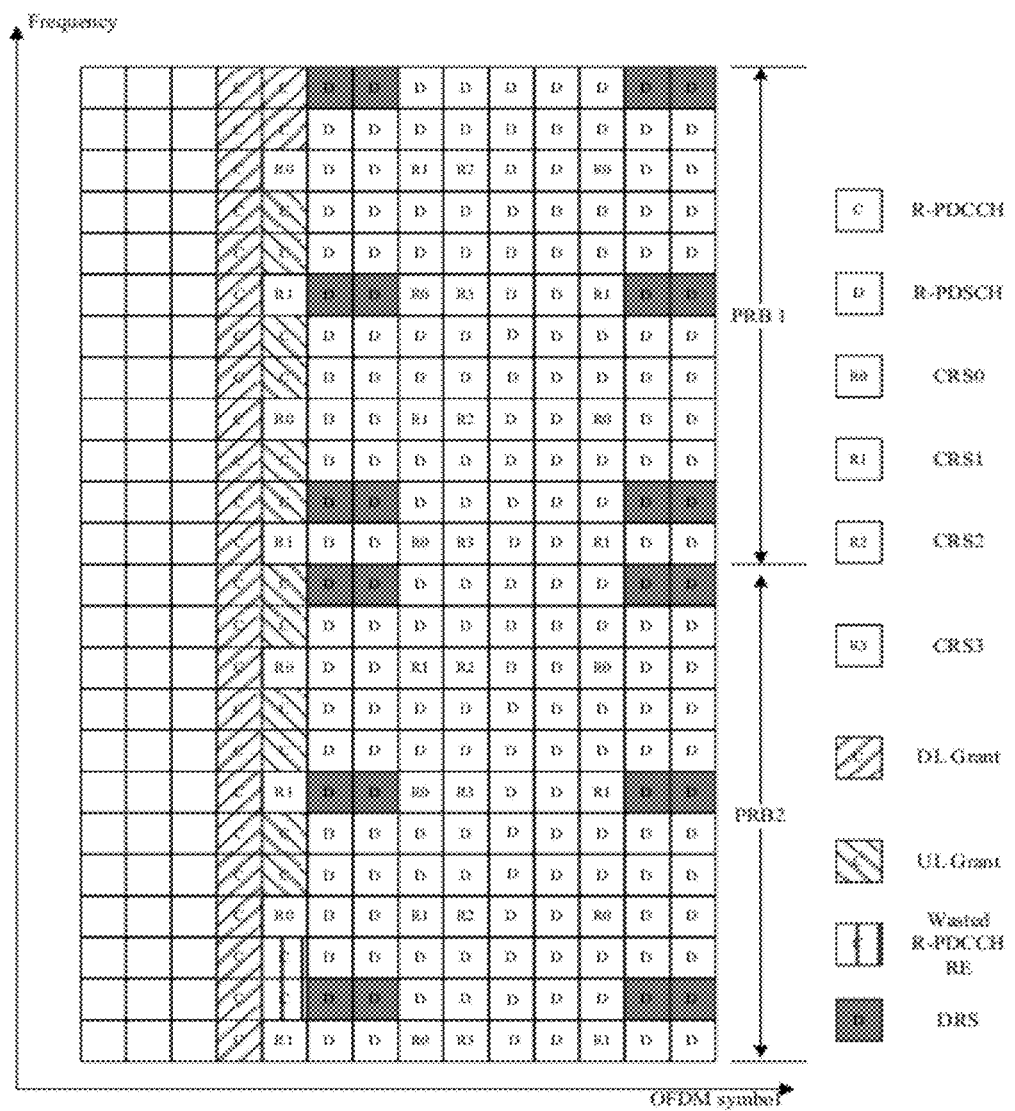
FIG. 10 is an illustration of R-PDCCH demodulated by DRS in one embodiment of the present invention.

In this case, RN can perform channel estimation for R-PDCCH and R-PDSCH according to CRS, and then demodulate R-PDCCH and R-PDSCH. Thereinto, R-PDSCH can be either non-precoded, or precoded according to a codebook, or precoded not according to any codebook. If R-PDSCH is non-precoded, RN can use CRS to demodulate R-PDSCH. If R-DPSCH is precoded according to a codebook, RN determines the codeword used for the present R-PDSCH and demodulate the R-PDSCH, where the codeword is indicated in the corresponding DL grant in R-PDCCH. If R-PDSCH is precoded not according to any codebook, RN demodulates the R-PDSCH using the corresponding DRS (dedicated reference signal) in R-PDCCH. R-PDCCH can be either non-precoded, or precoded according to a codebook, or precoded in the same way as R-PDSCH not according to any codebook. RN through corresponding CRS or DL grant or DRS to demodulate. When R-PDCCH and R-PDSCH are precoded in the same way not according to any codebook, RN demodulates R-PDCCH/R-PDSCH with corresponding DRS, where DRS is precoded in the same way as R-PDCCH/R-PDSCH in said same PRB. The first two situations are shown in FIG. 6 to FIG. 9, while the last situation using DRS to demodulate is shown in FIG. 10. The position and number of DRS in FIG. 10 is only for example and the present invention is not limited to that.

The other case is that there is no CRS in R-PDCCH.

Figure 11:
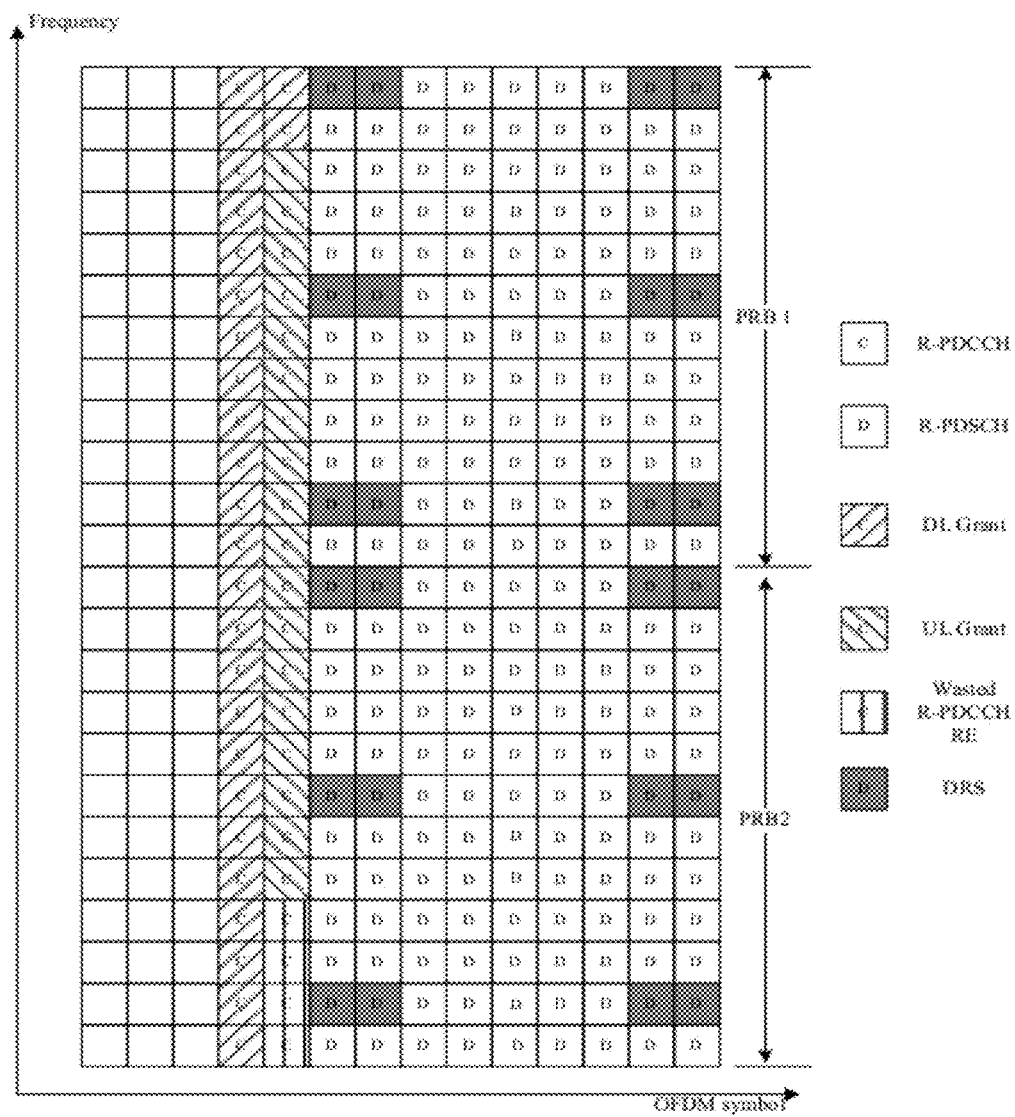
FIG. 11 is another illustration of R-PDCCH demodulated by DRS in one embodiment of the present invention.

Then, both R-PDCCH and R-PDSCH need to be demodulated with DRS, as shown in FIG. 11. Since there is no CRS, the overhead cost of DRS is the lowest. From the perspective of DRS overhead, the performance of this example is the best.

The following discusses blind detection of R-PDCCH of RN:

Each DCI format transmitted in R-PDCCH can be transmitted using different coding rates. In other words, a DCI format can be transmitted with different numbers of R-PDCCH REs. Hence, when RN performs blind detection of R-PDCCH, RN needs to know the following information:

First, RN needs to know the size of the DCI format. More specifically, RN can derive the size of the DCI format according to the system bandwidth and the type of DCI format which needs to be monitored.

Second, RN needs to know the possible coding rates that may be used to transmit the DCI format. Then RN performs blind detection for the DCI format according to different possible coding rates.

More specifically, the method of RN deriving the possible coding rates that can be used by base station to transmit DCI format includes:

The base station semi-statically informs RN on the set of possible coding rates by high-layer signaling, or uses the agreed set of coding rates. With this, RN can derive the possible coding rates that can be used by base station to transmit DCI format according to the high-layer signaling transmitted by base station or according to the agreed set of coding rates.

Figure 12:
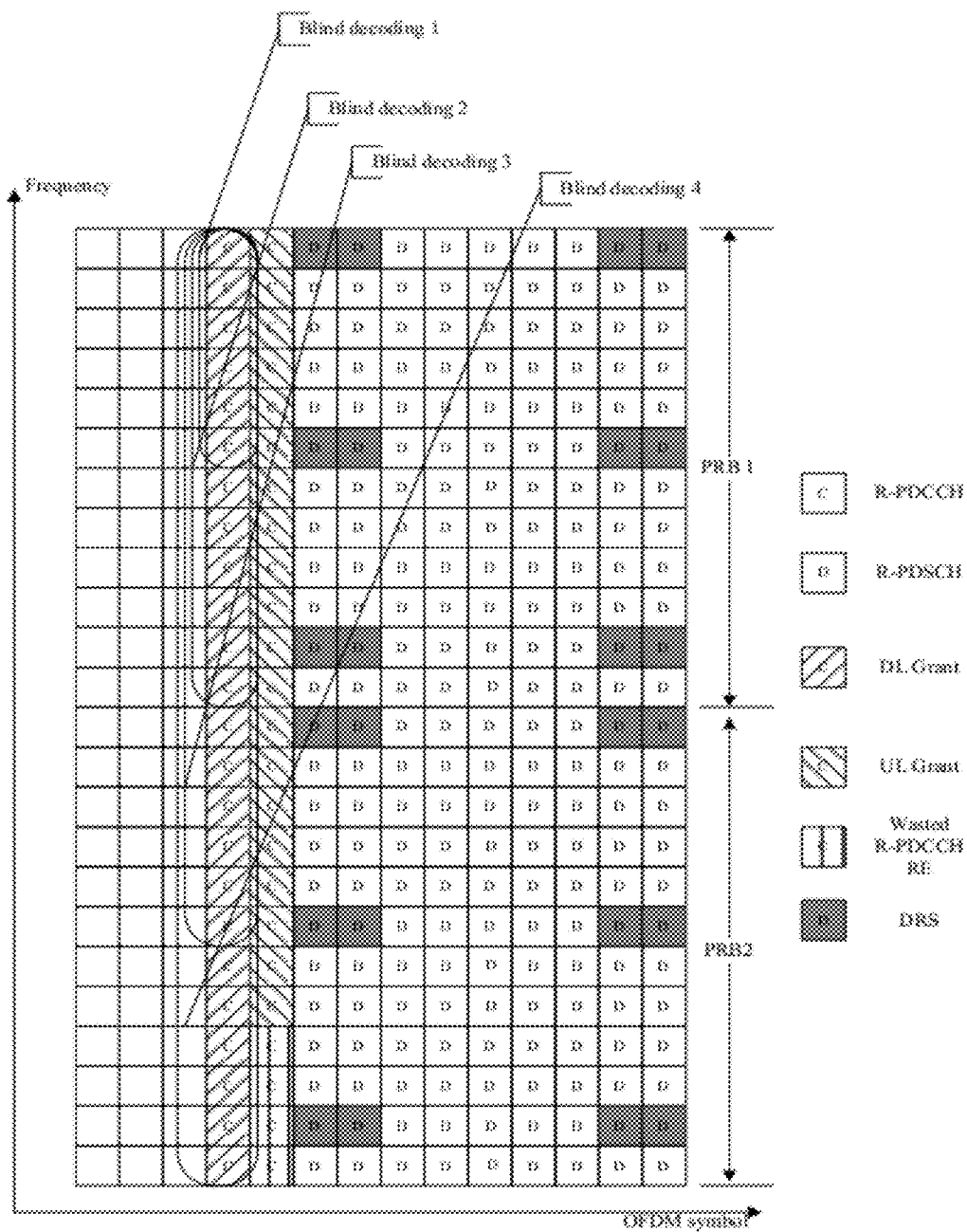
FIG. 12 is an illustration of blindly detecting R-PDCCH in one embodiment of the present invention.
Figure 13:
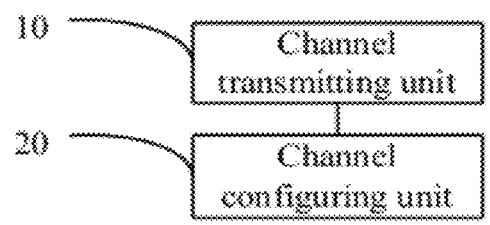
FIG. 13 is a structural diagram of the configuration equipment for dedicated control channels of relay system provided in one embodiment of the present invention.

For example, assuming a CCE (control channel element) consists of a number of REs and base station agrees with RN that the DCI format of RN could use {one CCE, two CCEs, three CCEs, four CCEs}, then RN needs to perform blind detection four times for a DCI format transmitted on R-PDCCH. Assuming a CCE comprising six REs as an example, as shown in FIG. 12, when RN detects a DCI format, it needs to perform blind detections on four sets of REs. Thereinto, the first set of REs includes one CCE, and the second, third, fourth sets of REs include two, three, four CCEs respectively. Thereinto, the starting RE of each set of REs is the highest frequency domain RE of the first OFDM symbol in R-PDCCH time-frequency resource. It should be noted that a CCE comprising six REs is only used as an example, for the purpose of simple illustration. In a real system, a CCE may include more or less REs.

Base station can also semi-statically inform RN one subset of all possible CCE sizes. Then RN uses the configured subset of CCEs to blindly detect R-PDCCH. For example, the system supports four CCE aggregation levels, such as {one CCE, two CCEs, three CCEs, four CCEs}. Base station semi-statically informs RN to use {one CCE, four CCEs} to blindly detect R-PDCCH. After RN receives the configuration of base station, it uses one CCE and four CCEs to blindly detect the DCI format included in R-PDCCH. In the embodiment of the present invention, RN detects the control information transmitted by R-PDCCH on at least one subset of the R-PDCCH time-frequency resources, where the starting RE of this subset is the lowest or highest frequency domain RE of the first OFDM symbol in R-PDCCH time-frequency resource.

By using the method provided by embodiment of the present invention, according to the number of OFDM symbols occupied by a R-PDCCH, the mapping of R-PDDCH/R-PDSCH to RE, demodulation of R-PDCCH/R-PDSCH, and blind detection of R-PDCCH, the design of dedicated control channel of the relay system can be achieved to meet the demand of R-PDCCH being specific to a RN.

Figure 14:
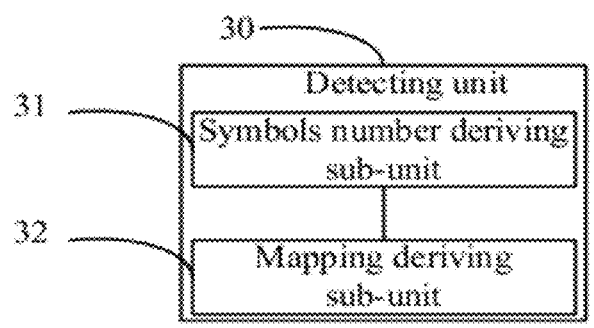
FIG. 14 is a structural diagram of the relay equipment provided in one embodiment of the present invention.
Figure 15:
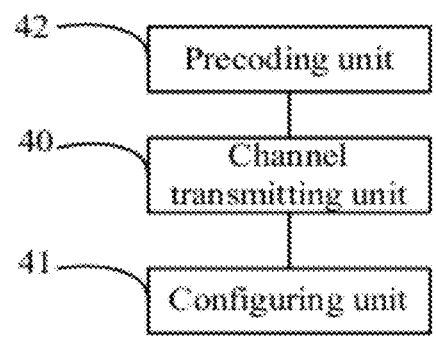
FIG. 15 is a structural diagram of the base station provided in one embodiment of the present invention.
Figure 16:
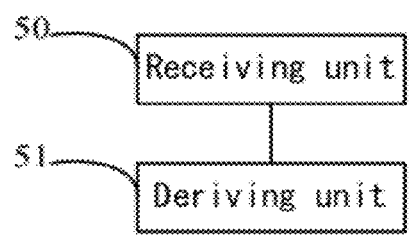
FIG. 16 is a structural diagram of the relay equipment provided in one embodiment of the present invention.

The embodiment of the present invention provides a relay system control channel configuration equipment, as shown in FIG. 14, comprising:

Channel transmitting unit 10, for transmitting control channel R-PDCCH to served relay equipment, wherein said R-PDCCH comprises related control information of said relay equipment and said R-PDCCH is dedicated R-PDCCH to said relay equipment.

Further comprising:

Channel configuring unit 20, for configuring OFDM symbols occupied by said R-PDCCH, and for configuring mapping of said R-PDCCH to resource element RE.

Said channel configuring unit 20 for:

Pre-configuring the number of OFDM symbols occupied by said R-PDCCH; or

Transmitting R-PCFICH in the same time-frequency region as said R-PDCCH, wherein the resource elements REs occupied by said R-PCFICH are different from the resource elements REs occupied by said R-PDCCH, and said R-PCFICH indicates the number of OFDM symbols occupied by said R-PDCCH.

Said channel configuring unit 20 for:

Mapping said R-PDCCH to resource element RE via frequency domain priority, i.e. said R-PDCCH is mapped onto resource elements first in ascending order of RE index and then in ascending order of OFDM symbol index.

Said channel configuring unit 20 is also used for at least one of following:

Configuring said R-PDCCH resource that comprises resource elements for R-PCFICH, resource elements for DCI format corresponding to DL grant, resource elements for DCI format corresponding to UL grant, and vacant R-PDCCH resource elements, when R-PCFICH is used to indicate the number of OFDM symbols occupied by said R-PDCCH.

Configuring said R-PDCCH resource that comprises resource elements for DCI format corresponding to DL grant, resource elements for DCI format corresponding to UL grant, and vacant R-PDCCH resource elements, when the number of OFDM symbols occupied by said R-PDCCH is semi-statically configured.

Configuring said R-PDCCH resource that does not include vacant R-PDCCH resource elements, when relay equipment determines the number of OFDM symbols occupied by said R-PDCCH by blind detection.

The embodiment of the present invention provides a relay equipment, as shown in FIG. 14, comprising:

Detecting unit 30, for detecting control channel R-PDCCH of backhaul link, wherein said R-PDCCH comprises related control information of said relay equipment and said R-PDCCH is dedicated R-PDCCH to said relay equipment.

Said detecting unit 30 comprising:

Symbols number deriving sub-unit 31, for deriving the number of OFDM symbols occupied by said R-PDCCH Mapping deriving sub-unit 32, for deriving the mapping of said R-PDCCH to resource element RE.

Said symbols number deriving sub-unit 31 more specifically is used for:

Deriving the number of OFDM symbols occupied by said R-PDCCH according to pre-configuration, or Deriving R-PCFICH transmitted in part of the time-frequency region as said R-PDCCH according to pre-configuration, wherein resource elements REs occupied by said R-PCFICH are different from resource elements REs occupied by said R-PDCCH, and the number of OFDM symbols occupied by said R-PDCCH is derived via said R-PCFICH.

Said mapping deriving sub-unit 32 for:

Deriving resource elements for DCI format corresponding to DL grant, resource elements for DCI format corresponding to UL grant, and vacant R-PDCCH resource elements in said R-PDCCH, when said relay equipment derives the number of OFDM symbols occupied by said R-PDCCH according to pre-configuration.

Deriving resource elements for R-PCFICH, resource elements for DCI format corresponding to DL grant, resource elements for DCI format corresponding to UL grant, and vacant R-PDCCH resource elements in said R-PDCCH, when said relay equipment derives the number of OFDM symbols occupied by said R-PDCCH according to R-PCFICH.

Said symbols number deriving sub-unit 31 is also used for:

Deriving the number of OFDM symbols occupied by R-PDCCH via blind detection.

Said symbols number deriving sub-unit 31 more specifically is used for:

Deriving size of each DCI format transmitted by said R-PDCCH and coding rates of DCI format used by said network side.

Blind detecting said DCI format according to coding rates of DCI format used by said network side.

Said symbols number deriving sub-unit 31 more specifically is used for:

Deriving size of each DCI format transmitted by said R-PDCCH according to the system bandwidth and the DCI format type that needs to be monitored.

Said symbols number deriving sub-unit 31 more specifically is used for:

Receiving high-layer signaling from network side, wherein said high-layer signaling carries a set of coding rates for DCI format used by said network side; or Pre-configuring a set of coding rates for DCI format used by said network side.

Said symbols number deriving sub-unit 31 more specifically is used for:

Receiving indication from network side, deriving a subset of all CCE aggregation levels of system, and blind detecting R-PDCCH according to said subset.

By using the equipment provided by embodiment of the present invention, according to the number of OFDM symbols occupied by a R-PDCCH, the mapping of R-PDDCH/R-PDSCH to RE, demodulation of R-PDCCH/R-PDSCH, and blind detection of R-PDCCH, the design of dedicated control channel of the relay system can be achieved to meet the demand of R-PDCCH being specific to a RN.

The embodiment of the present invention provides a relay control channel transmitting, comprising:

A base station transmitting a control channel Relay Physical Downlink Control Channel R-PDCCH to a relay node RN, wherein said R-PDCCH contains downlink control information to said RN, and said R-PDCCH is transmitted on dedicated R-PDCCH time-frequency resources wherein the time-frequency resources for transmission of said R-PDCCH to said RN is not used for transmission of any other R-PDCCH to any other RN.

Thereinto, said dedicated R-PDCCH time-frequency resources comprise at least one Orthogonal Frequency Division Multiplexing OFDM symbol in time domain and one physical resource block PRB in frequency domain, with each said PRB comprising at least two resource elements RE; the number of OFDM symbols in said dedicated R-PDCCH time-frequency resources is configured by said base station; the number of PRBs in said dedicated R-PDCCH time-frequency resources is configured by said base station.

In the method, said R-PDCCH is mapped onto said dedicated R-PDCCH time-frequency resource first in ascending order of RE index and then in ascending order of OFDM symbol index.

In the method, furthermore, said base station can transmit data channel R-PDSCH to said RN, wherein part of said R-PDSCH and part of said R-PDCCH are sent in the same PRB. Thereinto, a common precoding is applied to said R-PDSCH and said R-PDCCH transmitted in said same PRB; said R-PDSCH and said R-PDCCH are demodulated by dedicated reference signal DRS and a common precoding is applied to the DRS for said R-PDSCH and said R-PDCCH in said same PRB.

Said downlink control information to said RN comprising downlink DL grant and uplink UL grant; transmitting said DL grant and said UL grant in different OFDM symbols in said dedicated R-PDCCH time-frequency resources.

The embodiment of the present invention provides a kind of relay control channel detecting, comprising:

A relay node RN receiving a control channel Relay Physical Downlink Control Channel R-PDCCH sent by a base station, wherein said R-PDCCH contains downlink control information, and said R-PDCCH is transmitted on dedicated R-PDCCH time-frequency resources wherein the time-frequency resources for transmission of said R-PDCCH to said RN is not used for transmission of any other R-PDCCH to any other RN.

Thereinto, said dedicated R-PDCCH time-frequency resources comprise at least one Orthogonal Frequency Division Multiplexing OFDM symbol in time domain and one physical resource block PRB in frequency domain, with each said PRB comprising at least two resource elements RE; the number of OFDM symbols in said dedicated R-PDCCH time-frequency resources is configured by said base station; the number of PRBs in said dedicated R-PDCCH time-frequency resources is configured by said base station. Said R-PDCCH is mapped onto said dedicated R-PDCCH time-frequency resource first in ascending order of RE index and then in ascending order of OFDM symbol index.

The method further comprising:

Said RN receiving from said base station part of a data channel Relay Physical Downlink Shared Channel R-PDSCH in the same PRB used for transmission of said R-PDCCH. Thereinto, a common precoding is applied to said R-PDSCH and said R-PDCCH transmitted in said same PRB; said R-PDSCH and said R-PDCCH are demodulated by dedicated reference signal DRS and a common precoding is applied to the DRS for said R-PDSCH and said R-PDCCH in said same PRB.

Said downlink control information to said RN comprising downlink DL grant and uplink UL grant; transmitting said DL grant and said UL grant in different OFDM symbols in said dedicated R-PDCCH time-frequency resources.

The method further comprising: said RN detecting said R-PDCCH on at least one subset of said dedicated R-PDCCH time-frequency resource, wherein the starting RE of said subset is the lowest or highest RE of the first OFDM symbol in said dedicated R-PDCCH time-frequency resource.

The method further comprising: deriving size of said downlink control information transmitted in said R-PDCCH, and the possible coding rates that can be used for said downlink control information; said RN blind detecting said downlink control information according to said size of downlink control information derived by said deriving unit and the possible coding rates that can be used for said downlink control information.

The embodiment of the present invention provides a base station equipment, comprising:

Channel transmitting unit, for transmitting a control channel Relay Physical Downlink Control Channel R-PDCCH to a relay node RN, wherein said R-PDCCH contains downlink control information to said RN, and said R-PDCCH is transmitted on dedicated R-PDCCH time-frequency resources wherein the time-frequency resources for transmission of said R-PDCCH to said RN is not used for transmission of any other R-PDCCH to any other RN.

Further comprising:

Configuring unit, for configuring the number of OFDM symbols in said dedicated R-PDCCH time-frequency resources and the number of PRBs in said dedicated R-PDCCH time-frequency resources; said dedicated R-PDCCH time-frequency resources comprise at least one Orthogonal Frequency Division Multiplexing OFDM symbol in time domain and one physical resource block PRB in frequency domain, with each said PRB comprising at least two resource elements RE.

Thereinto, said R-PDCCH is mapped onto said dedicated R-PDCCH time-frequency resource first in ascending order of RE index and then in ascending order of OFDM symbol index.

Said channel transmitting unit is also used for transmitting part of a data channel Relay Physical Downlink Shared Channel R-PDSCH to said RN in the same PRB used for transmission of said R-PDCCH.

Further comprising:

Precoding unit, for applying a common precoding to said R-PDSCH and said R-PDCCH transmitted in said same PRB.

Thereinto, said downlink control information to said RN comprises downlink DL grant and uplink UL grant, and said transmitting unit is also used for transmitting said DL grant and said UL grant in different OFDM symbols in said dedicated R-PDCCH time-frequency resources.

The embodiment of the present invention provides a relay equipment, comprising:

Receiving unit, for receiving a control channel Relay Physical Downlink Control Channel R-PDCCH sent by a base station, wherein said R-PDCCH is received on dedicated R-PDCCH time-frequency resources wherein the time-frequency resources for receiving of said R-PDCCH to said RN is not used for transmission of any other R-PDCCH to any other RN;

Deriving unit, for deriving downlink control information of said RN in said R-PDCCH.

Thereinto, said dedicated R-PDCCH time-frequency resources comprise at least one Orthogonal Frequency Division Multiplexing OFDM symbol in time domain and one physical resource block PRB in frequency domain, with each said PRB comprising at least two resource elements RE. Said R-PDCCH is mapped onto said dedicated R-PDCCH time-frequency resource first in ascending order of RE index and then in ascending order of OFDM symbol index.

Said receiving unit is also used for receiving from said base station part of a data channel Relay Physical Downlink Shared Channel R-PDSCH in the same PRB used for transmission of said R-PDCCH.

A common precoding is applied to said R-PDSCH and said R-PDCCH transmitted in said same PRB; said deriving unit is also used for demodulating said R-PDSCH and said R-PDCCH by dedicated reference signal DRS wherein a common precoding is applied to the DRS for said R-PDSCH and said R-PDCCH in said same PRB.

Said deriving unit is also used for deriving said downlink control information to said RN comprising downlink DL grant and uplink UL grant, and said DL grant and said UL grant are transmitted in different OFDM symbols in said dedicated R-PDCCH time-frequency resources.

Said deriving unit is also used for detecting said R-PDCCH on at least one subset of said dedicated R-PDCCH time-frequency resource, wherein the starting RE of said subset is the lowest or highest RE of the first OFDM symbol in said dedicated R-PDCCH time-frequency resource.

Said deriving unit is also used for deriving size of said downlink control information transmitted in said R-PDCCH, and the possible coding rates that can be used for said downlink control information; the equipment also comprising blind detecting unit, for blind detecting said downlink control information according to said derived size of downlink control information and the derived possible coding rates that can be used for said downlink control information.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, comprising a number of instructions for making a computer equipment (such as mobile phone, personal computers, servers, or network equipments, etc.) to implement the methods described in the embodiments of the present invention.

The technical personnel in this field can understand drawing is a schematic of preferred embodiment. The module or process of drawing may not be necessary for implementing the present invention.

The technical personnel in this field can understand the modules of the equipments in the embodiments can be set in the equipments according to the description of the embodiments, and also can be set in one or more equipments different from the embodiments. Modules in the above-mentioned embodiments can be integrated in one entirety, and also can be deployed separately splitting into multiple sub-modules.

Serial numbers of the above-mentioned embodiments of the present invention are only used for description. It does not indicate the superiority of the embodiments.

The disclosed contents are only some specific embodiments of the present invention. However, the invention is not limited by these. All modifications of the embodiments in the present invention imagined by the technical personnel in this field should be in the protective range of the present invention.

The invention claimed is:

1. A method of transmitting control channel in a relay system, comprising:
   a base station transmitting a control channel Relay Physical Downlink Control Channel R-PDCCH to a relay node RN, wherein said R-PDCCH contains downlink control information to said RN, and said R-PDCCH is transmitted on dedicated R-PDCCH time-frequency resources wherein the time-frequency resources for transmission of said R-PDCCH to said RN is not used for transmission of any other R-PDCCH to any other RN, wherein
   said dedicated R-PDCCH time-frequency resources comprise at least one Orthogonal Frequency Division Multiplexing OFDM symbol in time domain and one physical resource block PRB in frequency domain, with each said PRB comprising at least two resource elements (REs);
   the number of OFDM symbols in said dedicated R-PDCCH time-frequency resources is configured by said base station;
   the number of PRBs in said dedicated R-PDCCH time-frequency resources is configured by said base station;
   said R-PDCCH is mapped onto said dedicated R-PDCCH time-frequency resources first in ascending order of RE index and then in ascending order of OFDM symbol index;
   said R-PDCCH is transmitted on one of at least two subsets of said dedicated R-PDCCH time-frequency resources, wherein a starting RE of each said subsets is the lowest or highest RE of first OFDM symbol in said dedicated R-PDCCH time-frequency resources.

2. The method of claim 1, further comprising:
   said base station transmitting part of a data channel Relay Physical Downlink Shared Channel R-PDSCH to said RN in the same PRB used for transmission of said R-PDCCH.

3. The method of claim 1, further comprising:
   said downlink control information to said RN comprising downlink DL grant and uplink UL grant; transmitting said DL grant and said UL grant in different OFDM symbols in said dedicated R-PDCCH time-frequency resources.

4. A method of detecting control channel in a relay system, comprising:
   a relay node RN receiving a control channel Relay Physical Downlink Control Channel R-PDCCH sent by a base station, wherein said R-PDCCH contains downlink control information, and said R-PDCCH is transmitted on dedicated R-PDCCH time-frequency resources wherein the time-frequency resources for transmission of said R-PDCCH to said RN is not used for transmission of any other R-PDCCH to any other RN, wherein;
   said dedicated R-PDCCH time-frequency resources comprise at least one Orthogonal Frequency Division Multiplexing OFDM symbol in time domain and one physical resource block PRB in frequency domain, with each said PRB comprising at least two resource elements (REs);
   the number of OFDM symbols in said dedicated R-PDCCH time-frequency resources is configured by said base station;
   the number of PRBs in said dedicated R-PDCCH time-frequency resources is configured by said base station;
   said R-PDCCH is mapped onto said dedicated R-PDCCH time-frequency resources first in ascending order of RE index and then in ascending order of OFDM symbol index;
   said RN detecting said R-PDCCH on at least two subsets of said dedicated R-PDCCH time-frequency resources, wherein a starting RE of each said subsets is the lowest or highest RE of first OFDM symbol in said dedicated R-PDCCH time-frequency resources.

5. The method of claim 4, further comprising:
   said RN receiving from said base station part of a data channel Relay Physical Downlink Shared Channel R-PDSCH in the same PRB used for transmission of said R-PDCCH.

6. The method of claim 4, further comprising:
   said downlink control information to said RN comprising downlink DL grant and uplink UL grant; receiving said DL grant and said UL grant in different OFDM symbols in said dedicated R-PDCCH time-frequency resources.

7. A base station equipment, comprising:
   a channel transmitting unit, for transmitting a control channel Relay Physical Downlink Control Channel R-PDCCH to a relay node RN, wherein said R-PDCCH contains downlink control information to said RN, and said R-PDCCH is transmitted on dedicated R-PDCCH time-frequency resources wherein the time-frequency resources for transmission of said R-PDCCH to said RN is not used for transmission of any other R-PDCCH to any other RN, further comprising:

a configuring unit, for configuring the number of OFDM symbols in said dedicated R-PDCCH time-frequency resources and the number of PRBs in said dedicated R-PDCCH time-frequency resources; said dedicated R-PDCCH time-frequency resources comprise at least one Orthogonal Frequency Division Multiplexing OFDM symbol in time domain and one physical resource block PRB in frequency domain, with each said PRB comprising at least two resource elements (REs), wherein, said R-PDCCH is mapped onto said dedicated R-PDCCH time-frequency resources first in ascending order of RE index and then in ascending order of OFDM symbol index;

said R-PDCCH is transmitted on one of at least two subsets of said dedicated R-PDCCH time-frequency resources, wherein a starting RE of each of said subsets is the lowest or highest RE of first OFDM symbol in said dedicated R-PDCCH time-frequency resources.

8. The base station equipment of claim 7, wherein, said channel transmitting unit is also used for transmitting part of a data channel Relay Physical Downlink Shared Channel R-PDSCH to said RN in the same PRB used for transmission of said R-PDCCH.

9. The base station equipment of claim 7, wherein, said downlink control information to said RN comprising downlink DL grant and uplink UL grant, said transmitting unit is also used for transmitting said DL grant and said UL grant in different OFDM symbol in said dedicated R-PDCCH time-frequency resources.

10. A relay equipment, comprising:

a receiving unit, for receiving a control channel Relay Physical Downlink Control Channel R-PDCCH sent by a base station, wherein said R-PDCCH is received on dedicated R-PDCCH time-frequency resources wherein the time-frequency resources for receiving of said R-PDCCH to said relay equipment is not used for transmission of any other R-PDCCH to any other relay equipment;

a deriving unit, for deriving downlink control information of said RN in said R-PDCCH; wherein, said dedicated R-PDCCH time-frequency resources comprise at least one Orthogonal Frequency Division Multiplexing OFDM symbol in time domain and one physical resource block PRB in frequency domain, with each said PRB comprising at least two resource elements (REs);

said deriving unit is also used for detecting said R-PDCCH on at least one subset of said dedicated R-PDCCH time-frequency resource, wherein a starting RE of said subsets is the lowest or highest RE of a first OFDM symbol in said dedicated R-PDCCH time-frequency resources;

said R-PDCCH is mapped onto said dedicated R-PDCCH time-frequency resources first in ascending order of RE index and then in ascending order of OFDM symbol index;

said receiving unit is also used for receiving from said base station part of a data channel Relay Physical Downlink Shared Channel R-PDSCH in the same PRB used for transmission of said R-PDCCH.

11. The relay equipment of claim 10, wherein, said deriving unit is also used for deriving said downlink control information to said RN comprising downlink DL grant and uplink UL grant, and said DL grant and said UL grant are transmitted in different OFDM symbols in said dedicated R-PDCCH time-frequency resources.

* * * * *